Feb. 4, 1947.    W. A. GIESEKE    2,415,167
PHOTOELECTRIC INSPECTION CIRCUIT
Filed June 21, 1944
Fig. 1
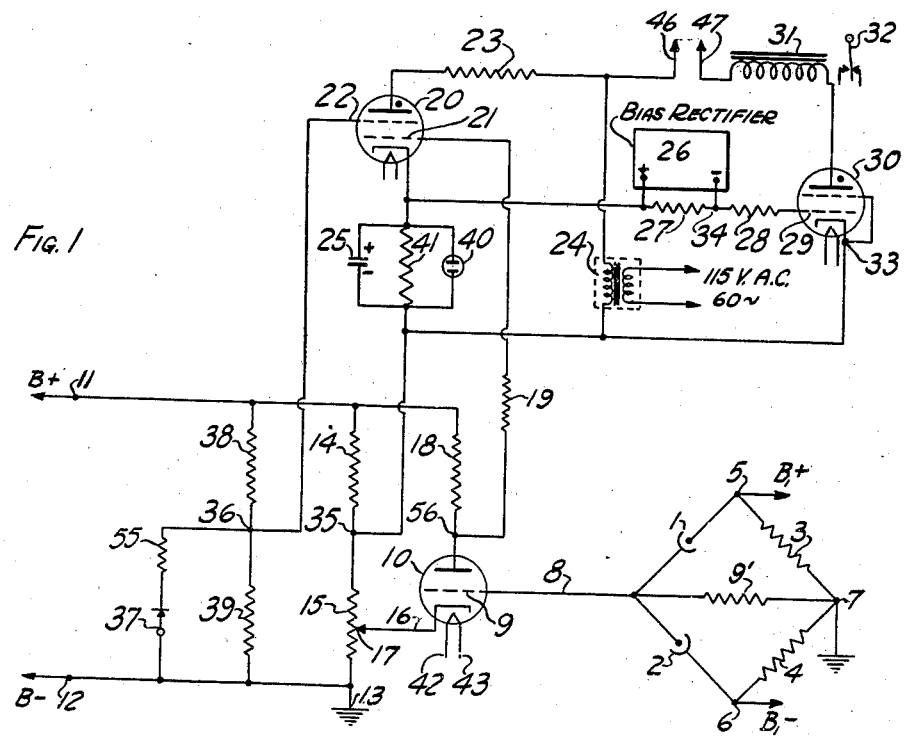
Fig. 2
Fig. 3
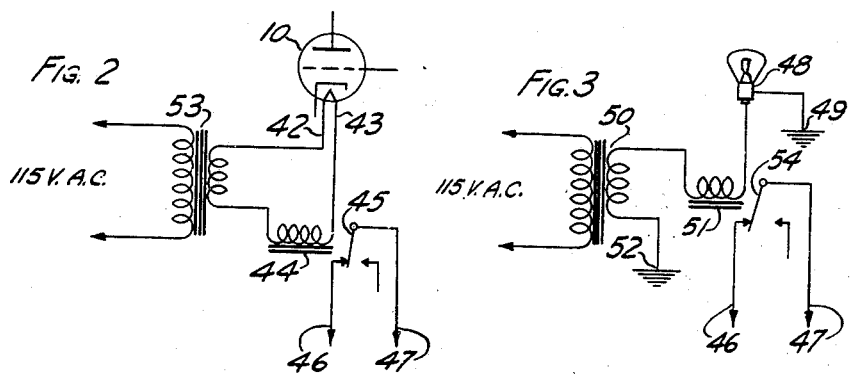
INVENTOR.
WERNER A. GIESEKE
BY Benedict & Swartwood
ATTORNEYS Patented Feb. 4, 1947

2,415,167

UNITED STATES PATENT OFFICE 2,415,167

PHOTOELECTRIC INSPECTION CIRCUIT

Werner A. Gieseke, Danville, Ill., assignor to Samuel C. Hurley, Jr., Danville, Ill.

Application June 21, 1944, Serial No. 541,366

2 Claims. (Cl. 250—41.5)

This application relates to improved electronic circuit embodying an electronic timer adaptable to inspection, identifying, measuring and control, and other types of operations where it is useful in connection with existing machines. It is particularly adapted to inspection operations wherein the piece to be inspected is maintained stationary in relation to the inspection point, although the piece may be rotated past an inspection point in order to scan the piece. One of the uses of my invention is to inspect annular objects such as rounds, objects shaped like an hour glass, top-shaped objects, cones, spheres, etc., said objects being rotated at the inspection point, but the object inspected is stationary relative to the inspection point.

It is an object of this invention to provide an improved electronic circuit for use in connection with the examination, inspection, and measurement of objects.

Another object of the invention is to provide an improved circuit and arrangement of control tubes and power tubes in such a manner that if any of the tubes burn out or do not properly function, the energizing means in the system will not be actuated. This has particular advantages when the apparatus is used to sort pieces or to accept or reject pieces, according to their dimension. The system will reject or send all pieces down a certain chute whether they are good or bad, providing any one of the amplifier tubes or other portion of the circuit fail. This has a great advantage where it is extremely important to prevent any bad pieces being mixed up with good ones. The energizing mechanism is only actuated when the piece is good and properly inspected.

In addition, the system has further advantages as follows:

1. Speed of operation.
2. More consistent operation since it inspects each piece at the same speed.
3. More positive action when used to reject bad pieces.
4. It incorporates a timing cycle which begins at the same time as the inspection cycle.
5. By the novel use of an electronic timer, it permits the article inspected to be sent to the proper place.

A further object is to control machines producing objects of various shapes, the size of which must be accurately controlled and accurately sorted.

A further object is to provide an improved electronic circuit for use in connection with the positioning of pieces requiring precise location for an inspection or smooth operation with or without simultaneous exercising control over the additional operation to be performed upon the piece under consideration; for example, in color printing, an imprint is made for each color employed. By means of a machine controlled by my electronic circuit, it is possible to position the work and to make each successive printing operation exactly as required within limits of greater accuracy than can be controlled mechanically by means of stops and similar positioning devices.

A further embodiment comprises an electronic circuit which may be used in connection with handling and/or inspecting pieces which normally have limber, flexible, and easily deformed edges, such as sheets of paper, box board, film, etc., but which must be positioned with great accuracy and which tend to distort readily when thrust against mechanical stops and the like, or when their position or size is indicated by the use of jets of fluid, e. g., air passing over the edge.

Another use of the system is in connection with the inspection of internal and external diameters. The distance between two predetermined points on an object, eccentricity and concentricity of objects such as rounds, bars, piston rings, cylinders, and the like. These may also include rivets and other irregularly shaped articles, tapered bearings and similar objects the length of which, diameter and angle of taper, as well as surface condition must be discovered.

The electronic circuit may be used in conjunction with machines for sorting objects of various sizes or shapes.

The invention may be used in connection with inspection or measurements of the condition of objects which are rotated so as to scan the entire internal or external surface of the object, detecting flat spots, pits, irregularities, etc.

It may be used for the coninuous inspection of drawn objects such as wire, threads, etc., or with the extrusion of tubes, rods, or other shapes. The purpose may be to detect wear in the dies, and in some cases, may be used to control the dimension of the piece being formed by controlling the machine making it.

The system may be used in the measurement and control of thickness and other dimensions of paper, films, card board, box board, linoleum, or sheet metal.

It may also be used in connection with machines for sorting of objects of different size having distinctive markings, for example, bank checks.

It may be used to control machines for the cutting or trimming of various objects such as the pages of books.

It may be used in connection with the measurement of tubular objects such as sausage casings which may vary in size throughout their length.

In general, my invention comprises a light sensitive circuit which may include phototubes connected in a bridge circuit sensitive to a light source, a first control tube having its conductance controlled by the light sensitive circuit, a second control tube having its conductance controlled by the first control tube, an electronic timer comprising a condenser connected in parallel with a neon tube such that the neon tube controls the amount of charge on the condenser and arranged in such a manner that the condenser is charged only when the second control tube is rendered ionizing or conducting. The power tube is connected to a source of electrical energy, to a bias rectifier which normally prevents this tube from ionizing. However, when the condenser is charged, a positive bias is placed on the power tube permitting it to ionize, and the amount of charge on the condenser and the length of time required for the condenser to discharge determines the length of time the power tube will continue to conduct. The power tube is connected to an energizing means such as a relay coil which may be used to actuate a relay switch. In addition, I preferably, although not necessarily, use a circuit breaker to place the second control tube in condition for ionization by the first control tube at the end of each operation of my device.

Other objects and advantages of my invention will become apparent by referring to the drawing. Although my device may be used for many types of inspection operations, for the purpose of illustration, I have described its use in connection with the testing of pieces for a proper dimension and the rejection or acceptance of a piece according to a predetermined dimension.

Fig. 1 is a diagrammatic illustration of the wiring diagram and phototube circuits.

Fig. 2 illustrates a method for deenergizing the system if the first control tube should burn out.

Fig. 3 illustrates a method for deenergizing the system if the light source burns out.

Referring to Fig. 1, phototubes 1 and 2 are arranged such that tube 1 is darkened while tube 2 remains in light when the piece is of the proper dimension. Although not shown in the drawing, except as partly illustrated in Fig. 3, since it is not material to my invention, a suitable source of light, together with a proper optical system must be used in conjunction with tubes 1 and 2, but this may be arranged in any conventional and well-known manner. For the same reasons, the reject and accept mechanisms are not illustrated since my invention is not limited to this type of use.

Tubes 1 and 2, together with resistors 3 and 4 form the four arms of a Wheatstone bridge connected across a source of D. C. potential at a point having its positive terminal connected at 5 and its negative terminal connected at point 6. The bridge is grounded at point 7. Point 7 is connected across the bridge to line 8 through resistor 9'. It is apparent that when the bridge is in balance, that is, when tubes 1 and 2 are both in shadow or both in light, line 8 is substantially at ground potential. When the bridge is unbalanced, it changes the potential at line 8. The tubes are arranged such that when tube 1 is in shadow, tube 2 remaining in light, a negative potential is placed on line 8, which places a negative potential on the grid or electrode 9 of the amplifying or first control tube 10 which is preferably, although not necessarily, of the vacuum type. The tube 10 obtains its source of power from a D. C. potential having its positive terminal at point 11 and its negative terminal at point 12, having its ground at point 13. Tube 10 obtains its proper operating voltage through dividing resistors 14 and 15. The cathode of the first control tube 10 is connected by contactor 16 at point 17 of resistor 15 in order to provide a relatively low negative bias for the tube 10. Tubes of this type will conduct when the negative bias is relatively low, i. e., of the order of less than 3 or 4 volts.

It will be apparent that when the bridge is in balance, a sufficiently low negative bias is maintained on tube 10 such that it will conduct, causing current to flow through its anode circuit through the load resistor 18 to the positive terminal at point 11. When such current flows through the anode circuit of tube 10, it places through the limiting resistor 19 a negative bias on control grid 21 of the second control tube 20, preferably, although not necessarily, of the gas-filled type, making this tube unable to ionize; that is, a negative potential is thus placed on the control grid 21 of the tube 20 which would not permit the tube to ionize, even though a proper positive potential was placed or maintained on the shield grid 22, as will be hereinafter described.

When the bridge is unbalanced, indicating that the piece is of the predetermined size, tube 1 is in shadow causing a negative potential to be placed on the control grid 9 of tube 10 which prevents this tube from conducting. Tube 20 is then able to ionize provided a proper positive potential on shield grid 22 is maintained as will be hereinafter described, because its cathode is connected at point 35 and the control grid 21 at point 11 which places a positive bias on tube 20.

When tube 20 ionizes or conducts, a current flows through the anode circuit of tube 20 through the resistor 23 by means of the A. C. potential shown at 24. This flow of current charges the condenser 25 to a sufficiently high potential that it will overcome the bias rectifier 26 connected in parallel with the resistor 27 and will place a positive potential, reduced somewhat by the limiting resistor 28, on the control grid 29 of the power tube 30, thus permitting that tube to ionize. Tube 30 is preferably of the gas-filled, arc discharge type, although other suitable types may be used. When tube 30 ionizes, A. C. current from the source 24 will flow through the anode circuit and energize the relay coil or energizing mechanism 31 which will actuate the relay switch 32. The relay switch 32 is shown in such a position that it rejects an article of improper size or rejects all articles, good and bad, if any power tube or any part of the system fails. When the relay coil pulls the relay switch over, it places the article in position to be accepted. Thus it should be noted that unless tube 30 is ionized, all articles will be rejected. Tube 30 has its shield grid connected directly to the cathode of the tube.

Tube 30 has its control grid bias measured between points 33 and 34. The shield grid bias of tube 20 is measured between the points 35 and 36. The control grid bias of tube 20 is measured between points 56 and 35.

It is apparent that when the bridge is in balance, tube 10 conducts, placing a negative potential on the control grid 21 of tube 20, preventing tube 20 from ionizing which, in turn, prevents tube 30 from ionizing since the condenser is not charged and the control grid 29 of tube 30 is connected to the negative terminal of the bias rectifier 26. Thus, the energizing device 31 does not operate the relay switch 32 and the piece is rejected.

A microswitch 37 is connected to a source of D. C. potential having its positive terminal at 11 and negative terminal at 12 through resistors 38 and 55. When the microswitch is closed, the shield grid 22 of tube 20 is maintained at substantially ground potential; whereas, the cathode of tube 20, being connected to point 35 at a point substantially above ground potential in a positive direction and therefore tube 20 will not ionize. When the microswitch is open, the shield grid 22 of tube 20 and the cathode are maintained at the same potential at points 36 and 35, respectively, and the tube is permitted to ionize.

In operation, the microswitch functions in the following manner: At or near the end of the inspection of one piece and just slightly before the feeding of another piece to be inspected into the inspection zone, the microswitch, which acts similar to a shutter on a camera, is opened momentarily placing the cathode and the shield grid of tube 20 at the same potential permitting this tube to ionize providing the piece is of the proper dimension. If the piece is good, the bridge is unbalanced, tube 10 is non-conducting, placing a positive potential on control grid 21 of tube 20, which causes a current to flow through its anode circuit and the condenser 25 is charged, overcoming the negative potential of the bias rectifier 26 and placing a positive potential on the control grid 29 of tube 30, causing that tube to ionize, which, in turn, energizes the relay switch 31. Immediately, the switch is closed and if the piece is bad, the energizing coil 31 will not be energized as heretofore described. The microswitch has a number of advantages which are particularly useful in my invention:

1. It increases the speed of the operation.
2. It gives more consistent operation since the piece to be inspected is inspected each time at the same speed.
3. It provides a more positive action on rejection.
4. The timing cycle begins at the same time as the inspection cycle.

As explained before, condenser 25 is charged when tube 20 ionizes due to a flow of A. C. current through the anode circuit of that tube. The neon tube 40 is connected in parallel with the condenser 25 and the resistor 41, and is so regulated and adjusted to obtain the desired charge on the condenser 25. The neon tube and condenser serve an important function in my invention. The neon tube 40 controls the amount of charge on the condenser 25 which, in turn, controls the length of time that the tube 30 remains ionized at the end of an inspection of a good piece or piece having the proper dimension. Due to the quick action of the microswitch which immediately opens placing tube 20 in conditions for ionization and then closes again, placing a negative bias on the tube 20; if the piece just inspected is good and the next piece bad, tube 20 would not ionize and tube 30 would be unable to ionize and the relay switch 32 would snap back into reject position and the good piece would not have time to pass into the accept receptacle if it wasn't for the action of the timer.

By the use of the condenser 25 and neon tube 40, a timing effect is obtained which keeps tube 30 ionized long enough for a good piece to pass to the accept receptacle even though tube 20 is unable to ionize. The capacity of neon tube 40 determines the amount of charge on condenser 25 and thus the length of timing is controlled.

The microswitch, by suitable camming, is synchronized with the feeding mechanism to enable to open and close at the proper time.

Briefly, the operation of a complete cycle of my device is as follows: A good piece comes into inspection position at the instant the microswitch opens and closes and the bridge is unbalanced in the manner previously described, permitting tube 20 to ionize, which charges condenser 25, which ionizes tube 30, which actuates the relay switch 32 to go over to the accept position and the timer or condenser 25 holds the relay switch in that position giving the acceptable piece time to pass into the accept receptacle. The microswitch now opens and closes and tube 20 ionizes if the next piece entering the inspection zone is good. The length of time it takes condenser 25 to leak through the resistor 41 determines the time required to hold the relay switch 32 in accept position in order to prevent a good piece being passed into the reject receptacle. If the next piece inspected is good, the cycle begins all over again. If the next piece is bad, the bridge being balanced, tube 20 does not ionize and, in turn, tube 30 does not ionize and the relay switch remains in the position shown on the drawing and the article passes into the reject receptacle.

For inspections like photoelectric camming, i. e., where no stop or guide is used but a beam of light is passed by both edges of an article thereby actuating two light sensitive circuits, one of said circuits acting as a reference point, or where two or more dimensions are desired to be measured simultaneously and both dimensions within the prescribed limits of tolerance before the article can be accepted, a second light sensitive circuit which may be similar to the bridge shown may be used. If used, it may be connected directly to the shield grid 22 of tube 20 in place of the circuit containing the microswitch. In other words, the output of the bridge circuit containing one or more phototubes or even a circuit not a bridge but containing two or more phototubes could be connected at point 36 and microswitch 37, and resistors 36, 37 and 38 eliminated. In this case, the light would be responsive in such a manner as to place a positive bias on grid 22 of tube 20 at the same time grid 21 becomes positive in order to render tube 20 conducting.

Tubes of the type 10 illustrated in Fig. 1, if they burn out, will cause all pieces good and bad to pass to the accept receptacle which is an undesirable condition. Tube 10 only conducts when a bad piece is in the inspection zone and therefore such a tube does not burn out frequently. However, to provide a means for making sure that no bad piece passes through the accept receptacle, the diagram in Fig. 2 illustrates one method of accomplishing this object. The heating filaments 42 and 43 of tube 10 are connected to a relay coil 44 and switch 45. When the heating filament of tube 10 is functioning, the relay 44 holds the contact of relay switch 45 to complete the circuit connection, lines 46 and 47 to the relay 31 of Fig. 1. If the filament burns out, relay 44 is deenergized, breaking the contact in the circuit by means of relay switch 45, and all the pieces, good and bad, are sent to the reject receptacle.

To further insure that no bad piece will be mixed with the good pieces, a diagram illustrated in Fig. 3 may be used. This illustrates a method of providing the circuit connected to the light source with a relay coil 51 and 52 so that in case the light source burns out or otherwise does not function, it would also break the circuit at point 46 and 47, which would cause all the pieces to pass to the reject receptacle. The light source in this diagram is connected to a source of A. C. potential 50 and in the line is provided a relay coil 51 and a relay switch 54 which is connected in the circuit across line 46 and 47 at which is also connected the relay coil 31 and the relay switch 32, as illustrated in Fig. 1. When the light source is good, relay coil 51 actuates relay switch 54, completing the circuit across 46 and 47. If the light source burns out or otherwise goes bad, the relay switch 54 breaks this circuit.

Figs. 2 and 3 illustrate a method of making this device more fool-proof but are not completely essential to my invention and other similar device may be used. If not used, points 46 and 47 may be connected as shown by the dotted line in Fig. 1.

If both devices illustrated in Figs. 2 and 3 are used, they should be connected in series in conventional manner.

In some instances, it may not be desired to use a microswitch 37. In that case, the shield grid 22 of tube 20 is connected directly to the cathode of that tube.

While I have illustrated and described one use of my invention, i. e., for determining whether or not a piece is of a proper dimension, the relay switch 32 in Fig. 1 may actuate any sort of device in accordance with the applied use of my invention. It may be used to control a feeding mechanism, for sorting, for identification, for indicating, and many other uses.

The circuit illustrated in Fig. 1 shows a method of permitting current to pass through tube 10 when the bridge is balanced, but by arranging the tubes so that phototube 2 is in shadow and tube 1 is in light, tube 10 would then conduct when the bridge is unbalanced and in that case, the control grid of tube 20 would be connected to point 11 which would permit tube 20 to ionize when tube 10 is conducting. Thus a method is provided so that in case tube 10 burns out, all the pieces would be rejected. Furthermore, the bias on tube 10 would have to be arranged in conventional manner so tube 10 would not conduct when the bridge is in balance.

I have illustrated in Fig. 1 the use of two phototubes in the bridge circuit but only one need be used and a resistor substituted for the other tube. This is particularly useful in determining or sorting different sized objects rather than inspecting an object for proper size; and in this case, a number of circuits illustrated in Fig. 1 may be used for each size desired to be indicated or sorted.

The above description and the drawing is intended to illustrate the principle of my invention, but is not intended to limit its scope since other embodiments using the principles of my invention, although not shown, are covered in the following claims.

I claim as my invention:

1. An electronic circuit comprising a light sensitive circuit containing a light sensitive device, a first electronic tube having an anode circuit, a cathode circuit and a control grid, said control grid operatively connected to and controllable by a light sensitive circuit depending on conditions of light and shadow on said light sensitive device in the light sensitive circuit, a second electronic tube having an anode circuit, a cathode circuit and two control grids, at least one of said control grids operatively connected to the anode circuit of the first electronic tube such as to be controllable by the flow of current to the first electronic tube and wherein the first and second electronic tubes are 180° out of phase, a third electronic tube having an anode circuit, a cathode circuit and a control gird with said control grid operatively and controllably connected to the cathode circuit of the second electronic tube such that the second and third electronic tubes are in phase, an electronic timer in the cathode circuit of said second electronic tube operatively connected to the control grid of the third electronic tube such that when the second electronic tube conducts a current it will place a positive bias on the control grid of the third electronic tube for a predetermined length of time thereby controlling the conductance of the third electronic tube for a predetermined length of time.

2. Apparatus of claim 1 further characterized by having the other control grid in the second electronic tube operatively connected to a switch, said switch directly associated with an inspection operation such as to periodically change the bias on said other control grid.

WERNER A. GIESEKE.

REFERENCES CITED

The following references are of record in the file of this patent:

UNITED STATES PATENTS

| Number | Name | Date |
|---|---|---|
| 1,966,243 | Hanna et al. | July 10, 1934 |
| 2,179,954 | Ranger | Nov. 14, 1939 |
| 2,234,011 | Shephard, Jr. | Mar. 4, 1941 |
| 2,231,621 | Goodridge | Feb. 11, 1941 |
| 2,384,263 | Schlesinger | Sept. 4, 1945 |
| 2,298,466 | Cooley | Oct. 13, 1942 |